UNITED STATES PATENT OFFICE.

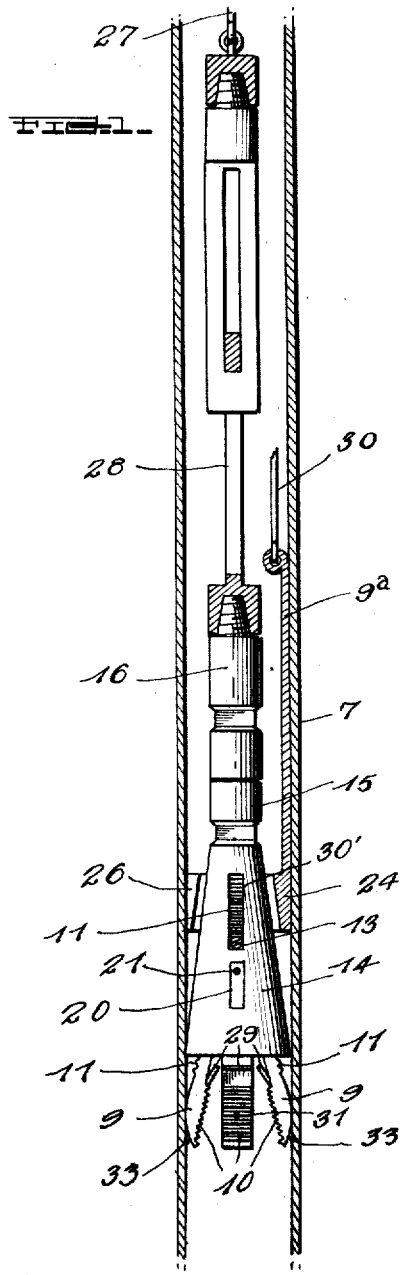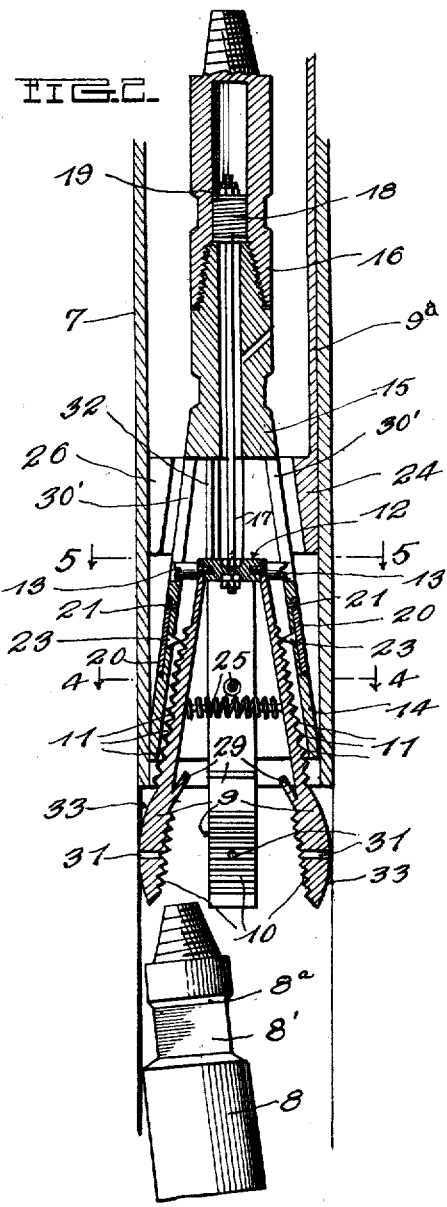

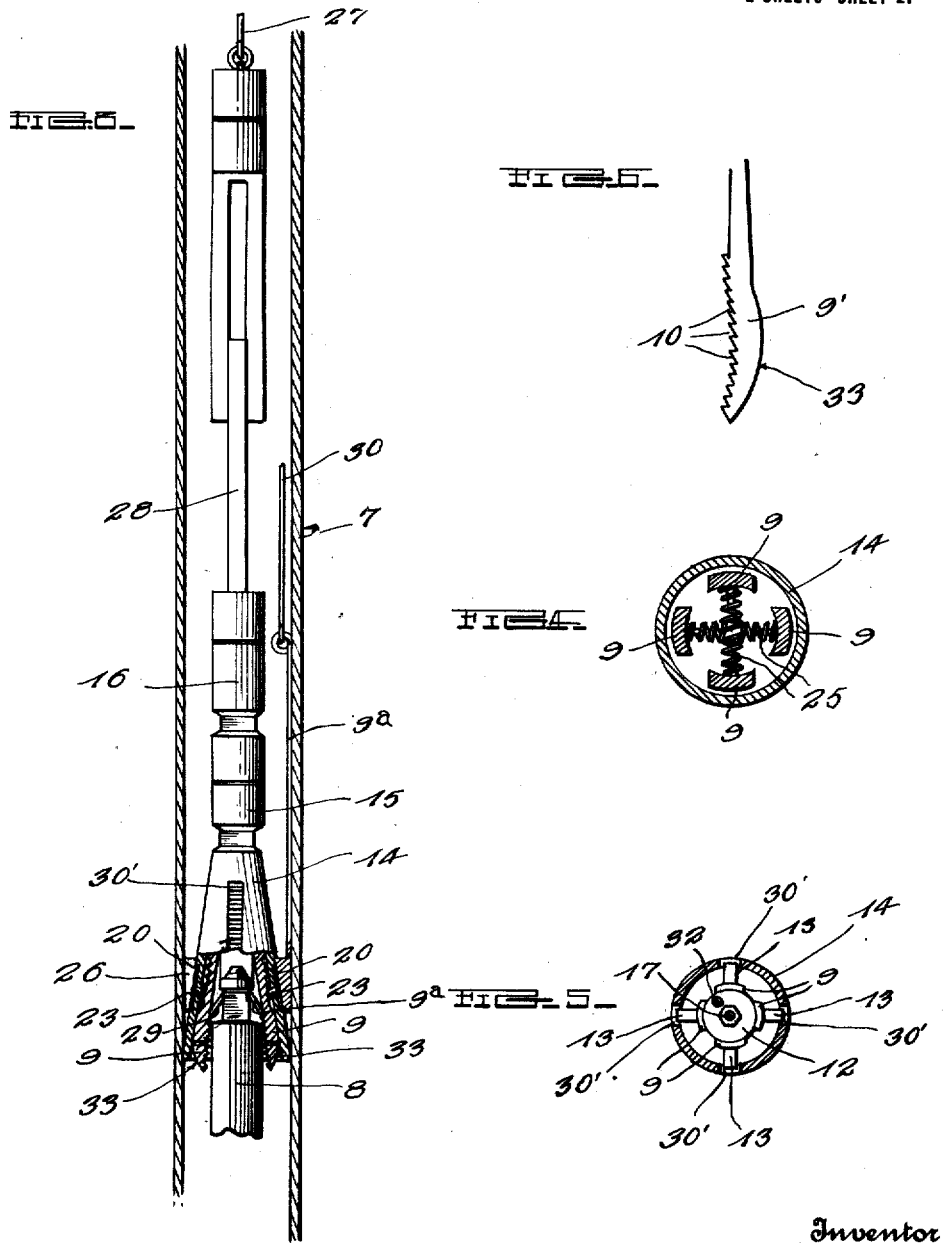

EDWARD A. KLIEWER, OF TOLAR, TEXAS.

OVERSHOT FISHING-TOOL.

1,337,476.   Specification of Letters Patent.   Patented Apr. 20, 1920.

Application filed July 17, 1919. Serial No. 311,423.

*To all whom it may concern:*

Be it known that I, EDWARD A. KLIEWER, a citizen of the United States, residing at Tolar, in the county of Hood and State of Texas, have invented certain new and useful Improvements in Overshot Fishing-Tools; and I do declare the following to be a full, clear, and exact description of the invention, such as will enable others skilled in the art to which it appertains to make and use the same.

The invention relates to an overshot fishing tool, and more specifically to an improved tool for removing bits, underreamer-lugs, bottoms of bailers, reamer-bowls and other articles from bored or drilled wells.

One object of this invention is to provide an improved device of this character that is extremely convenient and efficient in removing tools, parts of tools and other articles from wells, and which can be manufactured at a comparatively low cost.

Other objects and advantages may become apparent to persons who read the following details and descriptions in connection with the accompanying drawings in which:

Figure 1 is a view partly in vertical section, the main elements of the invention being shown in elevation.

Fig. 2 is an enlarged central vertical sectional view illustrating the main elements of my invention in connection with a well having a casing therein and having a tool resting in the usual position after being disconnected from the raising and lowering means.

Fig. 3 is a view somewhat similar to Fig. 1, but the main elements of the invention being shown in their operating or tool-engaging position.

Fig. 4 is a horizontal or lateral sectional view, the section being taken along the line 4—4 of Fig. 2.

Fig. 5 is a horizontal sectional view, the section being taken along the line 5—5 of Fig. 2.

Fig. 6 is a fragmental detail view illustrating a modified form of one of the jaws or clamping members.

Referring to these drawings in detail, in which similar reference characters correspond with similar parts throughout the several views, and in which the well-casing 7 and tool 8 are of ordinary construction,—

The main elements of the invention comprise a plurality of jaws 9 which are serrated at 10, these serrations being formed on the working faces of the jaws and being engageable with the tool 8 or with other articles to be raised from the well. Each of the jaws also comprises a longitudinal series of teeth 11 on the surface opposite to or outwardly from the working surface. The upper end of each jaw or bar 9 is united with or attachable to a supporting head 12, screws 13 being preferably employed as the attaching means.

A bell-shaped or hollow conical element 14 incloses the head 12 and the upper ends of the jaws 9. In fact, the major portion of the jaws is normally inclosed by the bell-shaped element, and means is provided for yieldingly supporting the jaws within the bell-shaped element as follows: The upper end of the bell-shaped element 14 is united with a tubular element 15, and these two elements 14 and 15 may be formed integrally, as shown, so they constitute a unitary member. The upper end of the element 15 is preferably screw-threaded so as to connect with element 16 of the ordinary raising and lowering means. A rod 17 has its lower end secured to the head 12, and extends upward through the central opening of the tubular element 15 and thence through a helical spring 18 and through a washer 19 which rests upon the upper end of the spring. A head or nut on the upper end of the rod 17 coöperates with the rod, spring, element 15, head 12 and bell-shaped element 14 for closing the jaws toward one another. In other words, the spring 18, rod 17 and head 12 mutually coöperate to draw the jaws within the bell-shaped element 14, and in doing so, the lower or outwardly diverging ends of the jaws are pressed inward by the lower end of the bell-shaped element, thereby causing the jaws to close upon any article which has been inserted between the jaws.

From the foregoing description, it will be seen that when a comparatively light article has been clamped or gripped by the jaws 9, such article may be supported by the spring 18 while the device is being raised from the well; but where the article to be raised is so heavy as to overcome the tension of the spring 18, the following auxiliary or supplemental means are provided in connection with the serrations 11: A spring 20 is provided for each jaw 9, each of these springs having one end secured to the bell-shaped element at 21, and this element is apertured at 22 to permit the passage of teeth 23. There may be one or more of the teeth 23 upon each spring 20, and each spring together with its tooth or teeth constitutes a detent which is interchangeably engageable with the teeth 11 of the adjacent jaw 9. Therefore, as the jaws 9 move longitudinally in the bell-shaped element, the teeth 23 ride over the teeth 11, and when it is desired to lock the teeth 23 in engagement with the teeth 11, a keeper 24 may be lowered so as to surround the springs 20 and hold the teeth 23 in engagement with the teeth 11. It will be seen, therefore, that the teeth 23 and 11 coöperate with one another and with the spring 18 for holding the jaws at any adjusted position with relation to the bell-shaped element 14.

Although the jaws 9 may be sufficiently elastic to effect their movement to their most extended position and permit them to be closed sufficiently to grip a comparatively small article, springs 25 may be provided for opening the jaws with relation to one another, or for supplementing the inherent spring action of the jaws.

Referring again to the keeper 24, this member is formed with a slot 26 which is sufficiently wide to permit it to be passed laterally around a cable 27 or rod 28 of the raising and lowering means, and therefore it is unnecessary to cut or disconnect the raising and lowering means or string of tools for the purpose of attaching this keeper. The keeper may be provided with an upwardly extending arm 29 having a rope or cable 30 connected to its upper end for lowering and raising it.

It is well known that well drilling and operating tools are usually provided with a square or flattened portion such as indicated at 8′ in Fig. 2, and that a shoulder 8ª is formed at the upper end of such flattened portion. Therefore, in the event that the jaws 9, or the jaws 9′ such as shown in Fig. 6, fail to sufficiently engage the tool 8 with their serrations 10, the shoulder or shoulders 8ª may be engaged by a plurality of springs or overshot fingers 9ª. Each of these fingers has its lower end secured to or integral with one of the jaws 9, and the upper end portion of each finger 29 diverges from the working face of the jaw in the direction of the attaching end of the latter.

As intimated in the foregoing, the teeth 11 and 23 are not necessary when light articles are to be raised, and therefore, such teeth may be dispensed with as shown in the modified form of the jaw illustrated in Fig. 6.

For the purpose of holding the jaws against rotation in the bell-shaped element, so that the jaws may coöperate with the detents 20 when necessary, the screws 13 have elongated heads which extend outward through slots 30 which are formed in the bell-shaped element 14.

Apertures 31 are provided in the jaws 9, and any appropriate form of tool may be engaged in the apertures 31 for pulling the jaws downward or outward with relation to the bell-shaped element 14, and a somewhat fragile member, such as a stick 32 may be placed between the head 12 and the lower end of the element 15 so as to hold the jaws in their extended position, as shown in Fig. 2.

In operating this device, it is first set by means of the stick 32, so that its jaws are in their most extended and wide open position; the fishing device is then lowered to the mouth of the well or casing, and the jaws are pressed inward sufficiently to permit them to enter the well or casing. As the outer surfaces of the jaws have convexed portions 33, the lower ends thereof are prevented from penetrating the sides of the well and being stopped thereby while being lowered into the well; when the jaws 9 surround the upper end of the article to be removed from the well, a downward pressure or jar on the element 15 causes the stick to break, and the bell-shaped element 14 now presses downward against the convexed portions 33 so as to cause the jaws to move inward into engagement with the article to be raised, and now upon raising the fishing tool, the tool or other article 8 is also raised, being securely gripped by the teeth 11 or engaged by the overshot fingers 9ª, or both.

Although I have described this embodiment of my invention very specifically it is not intended to limit this invention to these exact details of construction and arrangements, but changes may be made within the scope of the inventive ideas as implied and claimed.

What I claim as my invention is:

1. In a fishing tool, a plurality of jaws, a supporting head to which said jaws are secured, a tubular element connectible with a raising and lowering means, a supporting and actuating spring supported by said tubular element, a rod extending into said tubular element and secured to said head and supported by said spring so that said jaws are yieldingly supported by said spring, and means coöperative with said head, rod, tubular element, and spring for closing said jaws.

2. In a fishing tool, a plurality of jaws each formed with a longitudinal series of teeth, elastically supported means supporting said jaws and permitting the jaws to be moved up and down relative to said means, and detents interchangeably engageable with said teeth to hold said jaws in different positions relative to said elastically supported means.

3. In a fishing tool, a plurality of jaws each formed with a longitudinal series of teeth, elastically supported means supporting said jaws and permitting the jaws to be moved up and down relative to said means, detents interchangeably engageable with said teeth to hold said jaws in different positions relative to said elastically supported means, and a keeper adapted to be moved into and out of position for holding said detents in engagement with said teeth.

4. In a fishing tool, a plurality of jaws, a head supporting said jaws, a supporting element to which said head is yieldingly connected and adapted to move up and down, setting means to hold said head spaced from said supporting element during normal pressure on said setting means, said setting means being adapted to yield for permitting said head and supporting element to approach one another when abnormal pressure is applied on said setting means, and means to operate said jaws when said head and supporting element approach one another.

5. In a fishing tool, a plurality of jaws, a head to which said jaws are connected, a jaw-controlling member encompassing the jaws and being connectible to a raising and lowering means, and means connecting said head to said jaw-controlling member and being effective to move the free end portions of the jaws into the jaw-controlling member, said jaws being movable downward within a well casing and being movable horizontally until they bear against the well's side below the casing.

6. In a fishing tool, a plurality of jaws each formed with a longitudinal series of teeth, a jaw-supporting head, screws having elongated heads and being effective to hold said jaws in engagement with said jaw-supporting head, a bell-shaped element having slots therein, and springs supported by the bell-shaped element and each provided with a tooth to engage with said teeth of one of said jaws, said head being movably mounted in said bell-shaped element and adapted to move the free end portions of the jaws in and out of said bell-shaped element, said screw heads being slidable in said slots and thereby coacting with said bell-shaped element to hold the teeth of said jaws in registry with the teeth of said springs.

In testimony whereof I have hereunto set my hand.

EDWARD A. KLIEWER.